United States Patent [19]

Hutchings

[11] Patent Number: 5,357,338
[45] Date of Patent: Oct. 18, 1994

[54] PATH LENGTH CONTROLLER WITH OFFSET BIAS FOR A RING LASER GYRO

[75] Inventor: Thomas J. Hutchings, Thousand Oaks, Calif.

[73] Assignee: Litton Systems, Inc., Woodland Hills, Calif.

[21] Appl. No.: 512,257

[22] Filed: Jul. 11, 1983

[51] Int. Cl.[5] .................... H01L 41/08; G01C 19/64
[52] U.S. Cl. .................... 356/350; 356/349; 372/94
[58] Field of Search ............ 356/350, 349; 372/18, 372/201, 94; 332/7.51

[56] References Cited

U.S. PATENT DOCUMENTS

| | | | |
|---|---|---|---|
| 4,281,930 | 8/1981 | Hutchings | 356/350 |
| 4,320,974 | 3/1982 | Ljung et al. | 356/350 |
| 4,397,027 | 8/1983 | Zanpiello et al. | 372/94 |
| 4,398,293 | 8/1983 | Hall et al. | 356/350 |
| 4,410,274 | 10/1983 | Ljung | 356/350 |
| 4,410,276 | 10/1983 | Ljung et al. | 356/350 |
| 4,422,762 | 12/1983 | Hutchings et al. | 356/350 |
| 4,432,646 | 2/1984 | Rodloff et al. | 356/350 |
| 4,456,376 | 6/1984 | Carrington et al. | 356/350 |
| 4,467,478 | 5/1981 | Ljung et al. | 356/350 |

FOREIGN PATENT DOCUMENTS 2099178  12/1992  United Kingdom ............... 356/350

OTHER PUBLICATIONS

Grant, "The Litton LC-2717 Laser Gyro", May 17, 1979, pp. 22-28, IEEE 1979 Nat. Aerospace & Elec. Conf. Ohio.

Chan et al., "Multioscillator Laser Gyros", Sep. 1980, pp. 918-936, I.E.E.E. J. Quant. Elec., vol. QE-16, #9.

Hutchings, "Ring Laser Gyro—A Status Report", Sep. 9, 1980, pp. 1-15, NTIS Public. AD-A090 643/8.

Primary Examiner—Nelson Moskowitz
Attorney, Agent, or Firm—J. F. Kirk

[57] ABSTRACT

A path length controller for a ring laser gyro wherein the path length is dithered by dithering of one or more of the mirrors and the mirror or mirrors are controlled by a servo which is selectively biased in response to the servo signal to keep the mirror or mirrors in a position to support the largest amplitude of the principal mode of laser oscillation.

22 Claims, 1 Drawing Sheet

PATH LENGTH CONTROLLER WITH OFFSET BIAS FOR A RING LASER GYRO

BACKGROUND OF THE INVENTION

It is important to hold the path length of a ring laser gyro at an optimum length wherein the principal mode of oscillation is maximum. The principal mode or wave of the laser will oscillate, and the ring cavity will support such wave over a limited excursion from the optimum path length of the laser.

When the path length of the ring laser is optimum, the rate of change of the amplitude of the laser light intensity with respect to the position of any particular mirror is zero. In the prior art, a controlled mirror is dithered at a low frequency and amplitude. The dithering of the mirror causes the amplitude of the envelope of the output signal of the ring laser to be modulated at the dither frequency. The envelope of the output signal is then demodulated at the dither frequency, and the demodulated signal is integrated with the integrated signal used to move the average position of the dithered mirror to produce a maximum amplitude of the output envelope. Such control is typically accomplished by servoing the mirror to a position to dither about the position where the rate of change of the amplitude with respect to the mirror position is zero.

The above-described servo causes the demodulated amplitude of the ripple on the envelope of the output signal to approach its minimum value, when the average amplitude reaches its maximum value. Consequently, minimizing the amplitude of the ripple moves the cavity mirror to its optimum position.

Causing the demodulated amplitude of the ripple on the envelope of the output signal to approach its minimum value causes the cavity to be properly tuned to its principal mode of oscillation only if the starting position of the mirrors is such that the laser oscillation principal mode can be supported. Should the initial position of the mirror be such that it excites a secondary or undesired mode, the mirror must be moved controllably into a different position where it will excite the principal laser mode.

BRIEF DESCRIPTION OF THE INVENTION

It is contemplated by this invention to servo the mirror to a position where the rate of change of the laser light amplitude with respect to the mirror position is sufficiently high that such rates only occur in the mirror positions where only the principal mode of oscillation can be supported.

Upon start of the operation of the ring laser, the mirror positioning servo is controlled to a position to match a predetermined high rate that ensures that the mirror position is within an excursion range wherein only the principal mode of oscillation can be supported. The bias is then removed, and the servo is then successfully servoed into its optimum position wherein the laser light is at its maximum intensity and in its principal mode of oscillation.

It is therefore an object of the invention to maintain the mirror positions of a ring laser such that only the principal mode of oscillation is supported.

It is a more specific object of the invention to bias the position of at least one mirror of a ring laser to produce a path length which supports only the principal mode of oscillation of the laser.

It is a further object of the invention to provide a method for ensuring that a ring laser operates in only its principal mode of oscillation.

BRIEF DESCRIPTION OF THE DRAWINGS

Other objects will become apparent from the following description taken together with the accompanying drawings, in which.

DETAILED DESCRIPTION OF THE INVENTION

Figure 1:
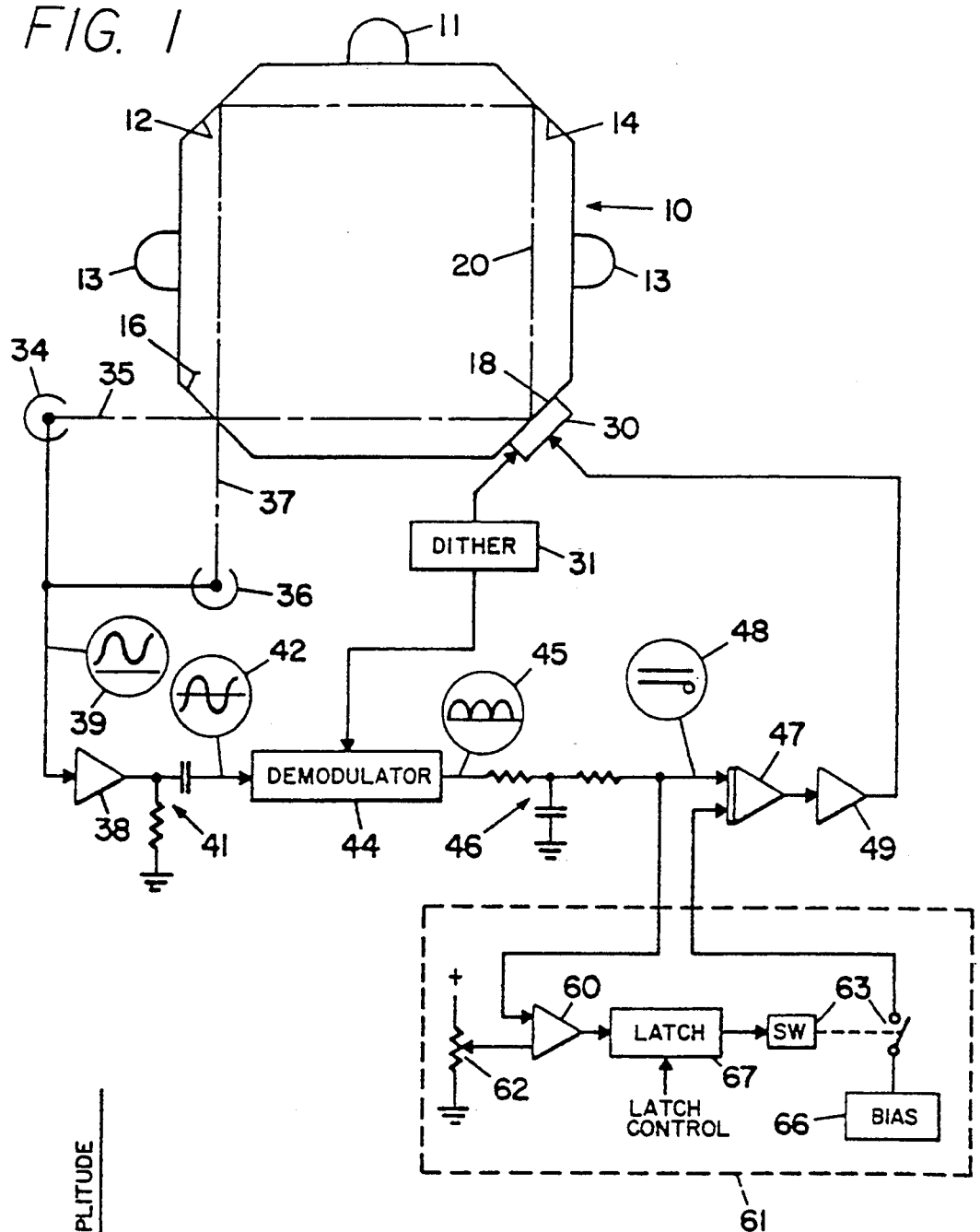
FIG. 1 is a diagram of a ring laser, together with a biased servo for positioning one of the ring laser mirrors according to this invention.

A ring laser 10 is shown schematically in FIG. 1. It is shown with four mirrors 12,14,16,18, but it could have merely three mirrors or more than four mirrors. The ring laser path is shown partly dashed at 20, and it extends entirely around a closed path between the mirrors. Means are used to excite the laser. For example, it is typically excited by applying voltages between a common cathode 11 and a pair of anodes 13 to produce electric fields in a pair of gain sections to stimulate counterpropagating laser waves.

Figure 2:
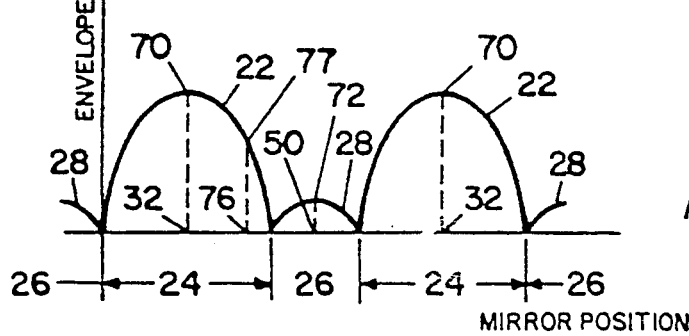
FIG. 2 is a plot of laser path gain against the position of the controlled mirror.

As shown in the graph of FIG. 2, such a ring laser can support several modes of oscillation. As shown at 22 in FIG. 2, a ring laser which is properly designed for use as a ring laser angular rate sensor or gyro typically has a principal mode of oscillation which is of substantially higher intensity than that of any other modes of oscillation. The length of the path of the ring laser may be altered by moving any or all of the mirrors. It is preferable, to simplify the tuning, to move only one mirror 18. There are separated ranges 24 of position of the mirror 18, and hence of the cavity length, wherein the principal mode of oscillation can be supported. By way of example and explanation, two of the ranges 24 are shown in FIG. 2, but there are many more such ranges.

When the mirror 18, and hence the cavity length, is positioned outside of the ranges 24, in the ranges 26, other secondary or unwanted modes are created. The secondary modes are shown by the curves 28.

To tune the ring laser, mirror 18 is positioned by a piezoelectric crystal or other transducer 30.

To servo the position of the mirror 18 to the optimum position 32 wherein the maximum laser intensity in the principal mode occurs, it is typical to servo the position of the transducer 30 and mirror 18. A portion of the counter-propagating laser light within the ring laser 10 is extracted by making the mirror 16 only partly reflective. Two photosensors 34, 36 intercept the two counterpropagating rays 35, 37 which are delivered through the mirror 16. Alternatively, only one of the two rays need be intercepted. The outputs of the two photosensors 34, 36 are connected to be summed in the summing amplifier 38. The transducer 30 is dithered by the dither signal source 31 at low amplitude and frequency, usually within the audible range, to produce an alternating signal 39 on the envelope of the light intensity signal at the input of amplifier 38. The output of the amplifier does not oscillate at the light frequency, but is a signal whose amplitude is proportional to the peak intensity of the light and whose frequency is caused by the dither signal. The constant or d.c. component of the signal may be filtered out in the amplifier 38, or it may be filtered through a simple R-C filter 40, 41 to produce a signal which is a measure only of the ripple on the envelope of the light signal. A graph of that ripple is shown at 42, and it is at the frequency of dither of the transducer 30. The dither signal source 31 is connected to the demodulator 44 to demodulate the signal 42. The demodulated signal is shown at 45. The demodulated signal is delivered to the input of an integrator 47 and thence through a power amplifier 49 to the transducer 30. Alternatively, the signal may be delivered through a low-pass filter 46 to the integrator 47. The signal out of the low-pass filter is shown at 48, and it is the average value of the signal 45. Movement of the transducer 30 is in a direction to minimize the amplitude of the signals 42 and 45 and the signal delivered from the amplifier 49, thereby moving the mirror to the position 32 or the position 50.

It is not satisfactory to move the mirror to the position 50 because, as shown by the curve 28, the ring laser is then oscillating in its secondary or unwanted modes of oscillation. Such a situation occurs if the mirror is initially in a position within the range 26.

To avoid causing the mirror to stabilize at the position 50, it is contemplated by this invention also to deliver the output signal from the demodulator to a summing amplifier 60 in a bias-offset circuit 61. A predetermined amplitude signal is delivered from a potentiometer 62 to the input of the summing amplifier 60. The output of amplifier 60 is delivered through a latch 67 to control the switch 63 when the ring laser is first turned on. The latch control may, alternatively, be a timed control that allows the bias to be connected only for a limited time, or it may be controlled by the power source (not shown), whereby once the switch 63 opens, it will not again close until the power is switched off.

Note that the amplitude of the signal 45 is a measure of the slope of the curve of FIG. 2. So long as the amplitude of the signal 45 is less than the amplitude of the signal set on the potentiometer 62, the switch 63 is closed to deliver a predetermined bias signal from the bias source 66 to the input of the integrator 47.

In operation, when the ring laser is started, there is no signal delivered from the demodulator 44 to the amplifier 60, and the voltage delivered from the potentiometer 62 keeps the switch 63 closed.

The amplitude of the bias signal from the source 66 is such that the mirror is not servoed to a zero slope such as that shown at 70 or 72 but to a steep slope such as that shown at 77. Note that the slope at 77 must be greater than any slope on the curve 28, and it typically is set about one half the distance up the curve 22. With the switch 63 closed, the mirror 30 is servoed to position 76 which is within the range 24. As soon as the amplitude of the output of the demodulator 44 substantially equals the amplitude of the voltage corresponding to the voltage delivered from potentiometer 62 to the amplifier 60, the switch 63 opens, and the mirror is immediately servoed to dither about the optimum position 32.

The latch 67 prevents the switch 63 from again closing during operation of the ring laser 10 as a gyro.

In one form, the latch is closed by the turning on of the power, and it opens after a predetermined time. The predetermined time is adequate to cause the mirror position to be moved into the range 24. When the power to the laser is turned off, the latch is reset so that the signal from 62 may again control and close the switch 63.

In still another form, the latch may be connected to be responsive to the output of amplifier 60. Once the signal at the output of amplifier 60 opens the switch 63, the latch 67 is disabled to prevent the reclosing of the switch 63. When the power to the laser is turned off, the latch is reset so that the signal from 62 may again control and close the switch 63.

It is to be stressed that modifications may be made in the scale factors of the summing amplifiers, and that the switch 63 may, optionally, be an electronic switch. Various relative speeds of switching may cause the switch 63 to open before the mirror is actually at the position 76. It is only essential that the mirror be within the range 24 when the switch 63 is opened.

Although the invention has been described in detail above, it is not intended that the invention be limited by that description, but only by the combination of the specification description and that of the appended claims.

What is claimed is:

1. In a ring laser having a plurality of mirrors forming a ring laser path and containing a lasing gas and means for delivering energy to said gas, wherein the position of at least one mirror is controlled by a transducer to tune said laser path, and wherein a servo senses the amplitudes of the counterpropagating laser beams in the lasing gas and controls the position of said at least one mirror and transducer to position said at least one mirror at a position wherein the intensities of the laser beams are maximum, the improvement comprising:

dithering signal means connected to drive said transducer to dither said at least one mirror;

bias signal means for delivering a bias signal into said servo;

switching means for connecting and disconnecting said bias signal to and from said servo;

comparison means connected to compare the amplitude of the input control signal of said servo to a predetermined threshold signal and to control said switching means in response to the difference between said compared signals; and latch means connected between said comparison means and said switching means to minimize reconnection of said bias signal into said servo.

2. Apparatus as recited in claim 1 wherein said latch means is controlled by a timed signal to prevent reclosure of said switching means after a predetermined time interval after turn-on of said ring laser.

3. Apparatus as recited in claim 1 wherein said latch means is controlled to close said switching means upon turn-on of said ring laser and to prevent reclosing of said switching means after its opening.

4. In combination:

a ring laser, including a plurality of corner mirrors, at least a first one of which is partly reflective;

a transducer attached to at least a second one of said mirrors to position said second mirror;

light sensing means for sensing the intensity of counterpropagating laser waves through said first mirror;

first amplifying means for amplifying the signal from said light sensing means;

demodulating means for receiving and demodulating the signal from said first amplifying means;

dither means connected to said transducer and to said demodulating means for dithering said second mirror and for demodulating signals delivered to said demodulating means;

integrating means connected to receive the output signal from said demodulating means;

power amplifier means connected to receive the output signal from said integrating means and to deliver signals to said transducer;

comparison amplifier means, connected to receive signals from said demodulating means and to compare said received signals with a predetermined threshold signal;

bias signal means;

switching means, for connecting the bias signal from said bias signal to the input of said integrating means and for disconnecting said bias signal from the input of said integrating means;

latch means connected between the output of said comparison amplifier means and said switching means to control the opening and closing of said switching means;

said latch means being controlled to be closed for a predetermined period of time after turn-on of said ring laser to close said switching means when the amplitude of said demodulating means is less than a predetermined amplitude.

5. Apparatus as recited in claim 4 wherein the output signal of said comparison amplifier means is poled to close said switching means when the output signal of said demodulating means is greater than a predetermined amplitude and to open said switching means when the output reduces to an amplitude that is less than said predetermined amplitude.

6. Apparatus as recited in claim 4 and further comprising low-pass filter means attached to the output of said demodulating means.

7. In combination:
a ring Laser, including a plurality of corner mirrors, a first one of which is partly reflective;
a transducer attached to a second one of said mirrors to position said second mirror;
light sensing means for sensing the intensity of light transmitted by counterpropagating laser waves through said first mirror;
first amplifying means for amplifying the signal from said light sensing means;
demodulating means for receiving and demodulating the signal from said first amplifying means;
dither means connected to said transducer and to said demodulating means for dithering said second mirror and for demodulating signals delivered to said demodulating means;
integrating means connected to receive the output signal from said demodulating means;
power amplifier means connected to receive the output signal from said integrating means and to deliver signals to said transducer;
comparison amplifier means, connected to receive signals from said demodulating means and to compare said received signals with a predetermined threshold signal;
bias signal means;
switching means, for connecting the bias signal from said bias signal means to the input of said integrating means and for disconnecting said bias signal from the input of said integrating means;
latch means connected between the output of said comparison amplifier means and said switching means to control the opening and closing of said switching means;
said latch means being controlled to close said switching means upon turn-on of said ring laser and to prevent reclosing of said switching means once it has opened.

8. Apparatus as recited in claim 7 wherein the output signal of said comparison amplifier means is poled to close said switching means when the output signal of said demodulating means is greater than a predetermined amplitude and to open said switching means when the output of said demodulating means reduces to an amplitude that is less than said predetermined amplitude.

9. Apparatus as recited in claim 7 and further comprising low-pass filter means attached to the output of said demodulating means.

10. A ring laser comprising:
a plurality of mirrors forming a ring laser path for supporting two counterpropagating laser beams;
a lasing gas in at least a portion of said path;
means for delivering energy to said gas to create said beams;
a transducer connected to dither and control the position of at least one said mirror to tune said laser path;
a servo, including a sensor, to sense the amplitudes of said counterpropagating laser beams and to control the position of said transducer to position said one mirror at a position wherein the intensities of said laser beams are maximum:
bias signal means for delivering a bias signal into said servo;
switching means for connecting and disconnecting said bias signal to and from said servo;
comparison means, including a predetermined amplitude comparison signal, connected to compare the amplitude of the control signal of said servo to said comparison signal and to control said switching means in response to the difference between said compared signals; and
latch means connected between said comparison means and said switching means to minimize reconnection of said bias signal into said servo.

11. Apparatus as recited in claim 10 wherein said latch means is controlled to close said switching means upon turn-on of said ring laser and to prevent reclosing of said switching mean after its opening.

12. Apparatus as recited in claim 10 wherein said latch means is controlled to close said switching means upon turn-on of said ring laser and to prevent reclosing of said switching means after the opening of said switching means.

13. A ring laser comprising:
means forming a closed conduit defining a path, including means for dithering and controlling the length of said path, said path enclosing a predetermined sensing axis;
a laser gas within at least a portion of said conduit;
means for energizing two counterpropagating laser beams in said path;
means for sensing the amplitudes of said laser beams;
oscillator means for energizing said means for dithering and controlling;
means for sensing the amplitudes of said beams and for producing signals which are measures of said amplitudes;
bias means for producing a bias signal of predetermined amplitude to offset the length of said path;
switching means for connecting and disconnecting said bias signal to and from said means for dithering and controlling; and latch means for switching said switching means to connect said bias to said means for dithering and controlling at start-up of said ring laser and subsequently switching said switching means to disconnect said bias from said means for dithering and controlling.

14. A ring laser comprising:
a plurality of mirrors forming a ring laser path;
at least a portion of said path containing a lasing gas;
means for delivering energy to said gas;
a transducer attached to and controlling the position of one mirror to tune said laser path;
a servo, including a beam sensor and demodulator, positioned and configured to sense the amplitudes of the counterpropagating laser beams in said path to produce a signal that is a measure of said amplitudes, demodulating means connected to receive said last-named signal and to demodulate it, and controlling means positioned and configured to control said transducer and said one mirror to a position wherein the intensities of the laser beams are maximum;
dithering signal means connected as a reference signal to said demodulating means and to drive said transducer to dither said one mirror;
bias signal means configured to deliver a predetermined bias signal into said servo and thence to said transducer;
switching means for connecting and disconnecting said bias signal to and from said servo and transducer;
comparison means connected to compare the amplitude of said amplitude measuring signal of said servo to a predetermined amplitude comparison signal, and to control said switching means in response to the difference between said compared signals; and
latch means connected between said comparison means and said switching means to minimize reconnection of said bias signal into said servo.

15. Apparatus as recited in claim 14 wherein said latch means is controlled by a timed signal to prevent reconnection of said switching means after a predetermined time interval after turn-on of said ring laser.

16. Apparatus as recited in claim 14 wherein said latch means is controlled to connect said switching means upon turn-on of said ring laser and to prevent reconnection of said switching means after its disconnection.

17. In combination:
a ring laser, including a plurality of corner mirrors, at least a first one of which is partly reflective;
a transducer attached to at least a second one of said mirrors to position said second mirror;
sensing means for sensing the intensity of counterpropagating laser waves through said first mirror;
first amplifying means for amplifying the signal from said sensing means;
demodulating means for receiving and demodulating the signal from said first amplifying means;
dither signal means connected to said transducer and to said demodulating means for dithering at least said second mirror and for demodulating signals delivered to said demodulating means;
integrating means connected to receive the output signal from said demodulating means;
amplifier means connected to receive the output signal from said integrating means and to deliver control signals to said transducer;
comparison amplifier means, connected to receive signals from said demodulating means and to compare the amplitude of the ripple of said received demodulated signals with a predetermined amplitude threshold signal;
bias signal means;
switching means, for connecting said bias signal from said bias signal means to the input of said integrating means and for disconnecting said bias signal from the input of said integrating means;
latch means connected between the output of said comparison amplifier means and said switching means to control the opening and closing of said switching means;
said latch means being controlled to be closed for a predetermined period of time after turn-on of said ring laser to close said switching means to connect said bias when the amplitude of said demodulating means is less than said predetermined amplitude.

18. Apparatus as recited in claim 17 wherein the output signal of said comparison amplifier means is poled to close said switching means when the demodulated ripple component of said output signal of said demodulating means is greater than a predetermined amplitude and to open said switching means when the demodulated ripple component of said output signal of said demodulating means reduces to an amplitude that is less than said predetermined amplitude.

19. Apparatus as recited in claim 17 and further comprising low-pass filter means attached to the output of said demodulating means.

20. In combination:
a ring laser, including a plurality of corner mirrors, a first one of which is partly reflective;
a transducer attached to a second one of said mirrors to position said second mirror; sensing means for sensing the intensity of counterpropagating laser waves through said first mirror;
first amplifying means for amplifying the signal from said sensing means;
demodulating means for receiving and demodulating the signal from said first amplifying means;
dither means connected to said transducer and to said demodulating means for dithering said second mirror and for demodulating signals delivered to said demodulating means;
integrating means connected to receive the output signal from said demodulating means;
amplifier means connected to receive the output signal from said integrating means and to deliver signals to said transducer;
signal generating means for creating a threshold signal of a predetermined amplitude corresponding to only the principal mode of operation of said ring laser;
comparison amplifier means, connected to receive demodulated signals from said demodulating means and from said signal generator means, to compare the amplitudes of said received signals;
bias signal means;
switching means, for connecting the bias signal from said bias signal means to the input of said integrating means and for disconnecting said bias signal from the input of said integrating means;

latch means connected between the output of said comparison amplifier means and said switching means to control the connecting and disconnecting by said switching means;

said latch means being controlled to connect said switching means upon turn-on of said ring laser and to prevent reconnection of said switching means once it has disconnected.

21. Apparatus as recited in claim 20 wherein the output signal of said comparison amplifier means is poled to connect said switching means when the ripple component of the output signal of said demodulating means is greater than said predetermined amplitude of said threshold signal and to disconnect said switching means when the output of said demodulating means reduces to an amplitude that is less than said predetermined amplitude.

22. Apparatus as recited in claim 20 and further comprising low-pass filter means attached between the output of said demodulating means and the inputs of said integrating means and said comparison amplifier means.

* * * * *